(12) United States Patent
Takeda

(10) Patent No.: US 7,475,993 B2
(45) Date of Patent: Jan. 13, 2009

(54) LIGHT SCANNING DEVICE AND IMAGE DISPLAY DEVICE

(75) Inventor: Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 364 days.

(21) Appl. No.: 11/279,358

(22) Filed: Apr. 11, 2006

(65) Prior Publication Data
US 2006/0238660 A1 Oct. 26, 2006

(30) Foreign Application Priority Data
Apr. 21, 2005 (JP) .............................. 2005-123194
Jan. 31, 2006 (JP) .............................. 2006-021976

(51) Int. Cl.
G03B 21/00 (2006.01)
G02B 26/08 (2006.01)

(52) U.S. Cl. ........................................ 353/31; 359/202

(58) Field of Classification Search ................... 353/94, 353/31, 48, 51, 78, 85, 121; 359/236, 197, 359/201, 202, 204; 348/202, 195, 196
See application file for complete search history.

(56) References Cited

U.S. PATENT DOCUMENTS

| 5,264,953 | A * | 11/1993 | Hirai et al. ..................... 349/33 |
| 6,363,095 | B1 * | 3/2002 | Jones et al. .................... 372/75 |
| 2002/0196414 | A1 * | 12/2002 | Manni et al. ................... 353/31 |
| 2003/0214633 | A1 * | 11/2003 | Roddy et al. ................... 353/31 |
| 2004/0070736 | A1 | 4/2004 | Roddy et al. |

FOREIGN PATENT DOCUMENTS

JP    A 2002-055296    2/2002

* cited by examiner

Primary Examiner—William C Dowling
Assistant Examiner—Ryan Howard
(74) Attorney, Agent, or Firm—Oliff & Berridge, PLC

(57) ABSTRACT

A light scanning device includes: at least four light sources that provide light beams having different wavelength spectra; and a scanner that scans the light beams from the light sources in a first direction and a second direction substantially perpendicular to the first direction.

13 Claims, 10 Drawing Sheets

LIGHT SCANNING DEVICE AND IMAGE DISPLAY DEVICE

BACKGROUND

1. Technical Field

The present invention relates to light scanning devices and image display devices and, in particular, to a technique for light scanning devices that scan laser light modulated in response to image signals.

2. Related Art

Image display devices that display images with laser light have been proposed. To display color images with laser light, a plurality of color lights, e.g., red (R) light, green (G) light, and blue (B) light, are used. One of the features of laser light is high monochromaticity. Laser light having high monochromaticity can express various colors in comparison with a general trichromatic image display system. The image display devices using laser light are expected to display images with high color reproducibility using wide-range colors. An example of the techniques for scanning a plurality of color lights is disclosed in Patent Document 1: JP-A 2002-55296.

However, it, is difficult for the known techniques that use RGB laser lights to express colors that have peaks in a wavelength region apart from the peak wavelengths of R, G, and B, such as yellow and emerald green. This poses the problem that images with high color reproducibility cannot be provided even with laser light.

SUMMARY

An advantage of some aspects of the invention is to provide a light scanning device and an image display device capable of displaying images with high color reproducibility with light beams.

According to a first aspect of the invention, there is provided a light scanning device including: at least four light sources that provide light beams having different wavelength spectra; and a scanner that scans the light beams from the light sources in a first direction and a second direction substantially perpendicular to the first direction.

"Having different wavelength spectra" indicates that the difference between peak wavelengths is out of the range of ±5 nm or that the difference between peak wavelengths is out of the range of ±1%. Providing at least four light sources that emit lights with different wavelength regions allows the scan of lights with other wavelength spectra in addition to the known RGB color lights. This allows the expression of a wider range of colors than that using known light scanning devices that scan RGB color lights. This achieves a light scanning device capable of displaying high-reproducibility images with light beams. The use of light sources for providing lights with other wavelength spectra in addition to the known color light sources allows the dispersion of the power of light beams necessary for displaying images. This can reduce loads on the light sources.

It is preferable that the light scanning device further include: a red light source that emits red light, a green light source that emits green light, and a blue light source that emits blue light; and at least one of a light source that emits light with a wavelength spectrum having a peak in the range from 550 nm to 590 nm and a light source that emits light with a wavelength spectrum having a peak in the range from 470 nm to 500 nm. For example, assume that the R light source has a peak wavelength at 650 nm, the G light source has a peak wavelength at 530 nm, and the B light source has a peak wavelength at 440 nm. Providing light with a wavelength spectrum having a peak in the range from 550 to 590 nm allows yellow light having a peak between the wavelengths of R and G lights to be expressed sufficiently. Providing light with a wavelength spectrum having a peak in the range from 470 to 500 nm allows emerald green light having a peak between the wavelengths of G and B lights to be expressed sufficiently. This allows at least one of yellow and emerald green lights to be expressed sufficiently, thus achieving high color reproducibility.

It is preferable that the light source that emits light with a wavelength spectrum having a peak in the range from 550 nm to 590 nm and the light source that emits light with a wavelength spectrum having a peak in the range from 470 nm to 500 nm each have a wavelength conversion element. A second harmonic generation (SHG) element, one of wavelength conversion elements, converts light beams to light of a half wavelength of incident light. The light source for emitting the light with a wavelength spectrum having a peak in the range from 550 to 590 nm can be a semiconductor laser source that emits laser light having a peak wavelength in the range from 1100 to 1180 nm. The light source for emitting light with a wavelength spectrum having a peak in the range from 470 to 500 nm can be a semiconductor laser source that emits laser light having a peak wavelength in the range from 940 to 1000 nm. Thus an easily available general-purpose laser source can be used.

It is preferable that the light sources that emit lights with different wavelength spectra are modulated independently. Thus images with high color reproducibility can be displayed with lights of different wavelength spectra.

It is preferable that the light sources be disposed one or more for at least one of the lights with the different wavelength spectra. Thus light beams can be emitted depending on the maximum output of the color light sources.

It is preferable that the scanner include reflecting mirrors that reflect the light beams, and that one of the reflecting mirrors reflect color light incident on the reflecting mirror at higher reflectance than that of other color lights different from the color light incident on the reflecting mirror. The reflecting mirrors can easily achieve higher reflectance for light of a narrow wavelength region than that of a wide wavelength region. Launching only the light in the high-reflectance wavelength region into the reflecting mirror can reduce the absorption of light into the reflecting mirror. Reducing the absorption of light into the reflecting mirror can reduce the accumulation of heat into the reflecting mirror. Reducing the accumulation of heat into the reflecting mirror can reduce the degradation of the reflecting mirrors thus providing high reliability.

It is preferable that the at least one of the reflecting mirrors reflect at least two color lights. The reflecting mirror can provide high reflectance for color lights having close peak wavelengths out of a plurality of color lights. Reflecting a plurality of color lights with one reflecting mirror can reduce the number of reflecting mirrors in comparison with using a reflecting mirror for each color light. This reduces the number of components of the light scanning device, achieving simple configuration.

It is preferable that the reflecting mirror reflect one of the at least two color lights, whose amount is the maximum at the maximum gray level, at higher reflectance than that of other color lights other than the one color light of the at least two color lights. The use of a reflecting mirror that reflects a plurality of color lights may decrease in reflectance in comparison with a reflecting mirror that reflects only one color light. Color lights having a small amount of light at the maximum gray level have little influence of heat accumulation on the reflecting mirrors. Accordingly, setting higher reflectance for one color light having the maximum amount of light at the maximum gray level than for other color lights can reduce the accumulation of heat.

It is preferable that the light scanning device further include: a first color light source that emits first color light and a second color light source that emits second color light, and that the first color light source and the second color light source be different in number. When there is a difference in the maximum output between the first color light source and the second color light source, the numbers of the first color light source and the second color light source can be different, depending on the output. Providing light sources of the number corresponding to the output eliminates the necessity of decreasing the output of the light source with high maximum output to the same level as that of the other light sources with low maximum output, thus preventing waste of the light source with high maximum output. Thus a light scanning device capable of scanning a plurality of color lights efficiently depending on the output balance of color lights. There is also no need to provide light sources with high maximum output more than necessary, providing a simple and inexpensive light scanning device.

It is preferable that the light source have a wavelength conversion element and expresses gray levels by modulating the fundamental wave to be incident on the wavelength conversion element. Modulating the fundamental wave allows gray levels to be expressed in the same manner as without wavelength conversion.

It is preferable that the scanner scans at least two color lights that are approximate to each other at a narrower space over a scanning surface than that of other color lights other than the approximate color lights. The approximate colors indicate colors with close peak wavelengths, out of the color lights from the color light sources. Thus flickering can be reduced.

It is preferable that the light source include: a laser source that emits laser light and a wavelength conversion element that converts the wavelength of the light from the laser source; and a heat insulator that insulates the laser light and the wavelength conversion element from each other. The wavelength conversion element sometimes shows a temperature characteristic in which wavelength conversion efficiency changes with temperature. Thermally insulating the wavelength conversion element from the laser source, the heating element, with a heat insulator can reduce changes in wavelength conversion efficiency due to the heat from the laser source.

It is preferable that the light scanning device further include: a first color light source that emits first color light and a second color light source that emits second color light and that the first color light source includes a first laser source that emits the first color light; the first color light source emits the first color light using a first-color-light wavelength conversion element that converts the wavelength of the light from the first laser source; the second color light source includes a second laser source that emits the second color light; and the heat insulator insulates the first laser source and the second laser source from the first-color-light wavelength conversion element. Thermally insulating the first laser source and the second laser source from the first-color-light wavelength conversion element allows the first color light source and the second color light source to be disposed in one package, and reduces changes in wavelength conversion efficiency due to the heat from the first laser source and the second laser source. This reduces changes in wavelength conversion efficiency and the size of the light source.

According to a second aspect of the invention, there is provided a image display device for displaying images with the light from a light scanning device, wherein the light scanning device is the light scanning device described above. The use of the light scanning device allows images with high color reproducibility to be displayed with light beams. Thus an image display device can be provided which is capable of displaying images with high color reproducibility with light beams.

BRIEF DESCRIPTION OF THE DRAWINGS

The invention will be described with reference to the accompanying drawings, wherein like numbers reference like elements.

DESCRIPTION OF EXEMPLARY EMBODIMENTS

The invention will be described with reference to the accompanying drawings, wherein like numbers reference like elements.

First Embodiment

Figure 1:
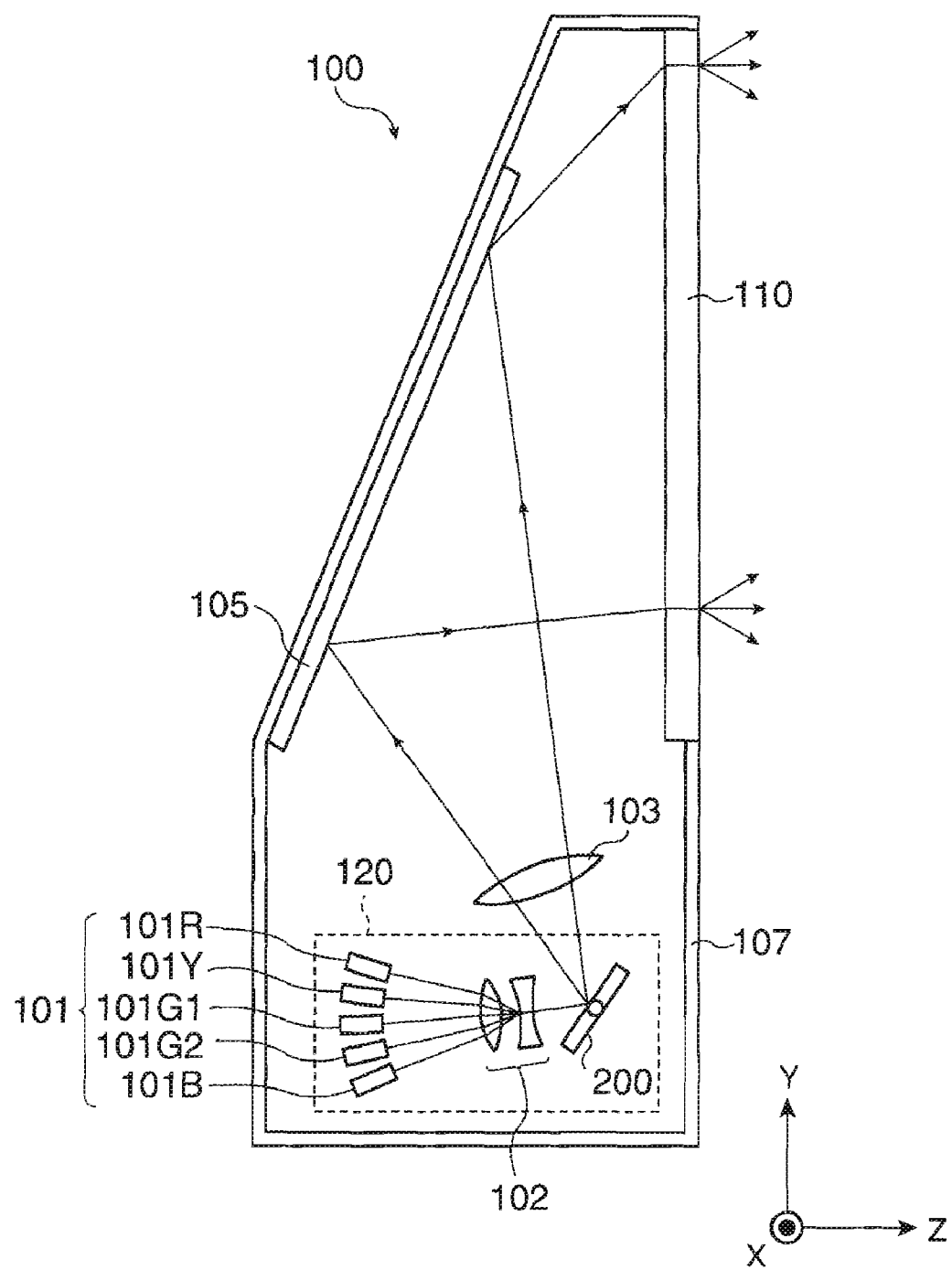
FIG. 1 is a diagram showing a schematic configuration of an image display device according to a first embodiment of the invention.

FIG. 1 shows a schematic configuration of an image display device 100 according to a first embodiment of the invention. The image display device 100 is what is called a rear projector that scans laser light onto one surface of a screen 110 for image viewing with the light exiting from the other surface of the screen 110. A light scanning device 120 disposed in the image display device 100 scans laser light modulated in response to image signals. The image display device 100 displays images by allowing the laser light from the light scanning device 120 to pass through the screen 110.

The light scanning device 120 has a light source unit 101 including five light sources 101R, 101Y, 101G1, 101G2 and 101B. The light sources 101R, 101Y, 101G1, 101G2, and 101B modulate laser beams having different wavelength spectra in response to image signals, and provide them. "Having different wavelength spectra" indicates that the difference between peak wavelengths is out of the range of ±5 nm or the difference between peak wavelengths is out of the range of ±1%. The R light source 101R is a red light source that emits red light with a wavelength spectrum having a peak at 650 nm. The G1 light source 101G1 is a green light source that emits green light with a wavelength spectrum having a peak at 520 nm. The B light source 101B is a blue light source that emits blue light with a wavelength spectrum having a peak at 440 nm.

The Y light source 101Y is a light source that emits yellow light with a wavelength spectrum having a peak at 570 nm. The G2 light source 101G2 is a green light source that emits emerald green light with a wavelength spectrum having a peak at 490 nm. The R light source 101R and the B light source 101B can be semiconductor laser sources or solid-state laser sources having a modulator for modulating laser light. The Y light source 101Y, the G1 light source 101G1, and the G2 light source 101G2 can be SHG laser sources having an SHG element, or a wavelength conversion element.

The light sources may not necessarily have the above-mentioned peak wavelengths of wavelength spectra, provided that the R light source 101R has a peak wavelength in the range from 600 to 700 nm, that the G1 light source 101G1 has a peak wavelength in the range from 500 to 550 nm, that the B light source 101B has a peak wavelength in the range from 400 to 470 nm, that the Y light source 100Y has a peak wavelength in the range from 550 to 590 nm, and that the G2 light source 101G2 has a peak wavelength in the range from 470 to 500 nm.

Figure 2:
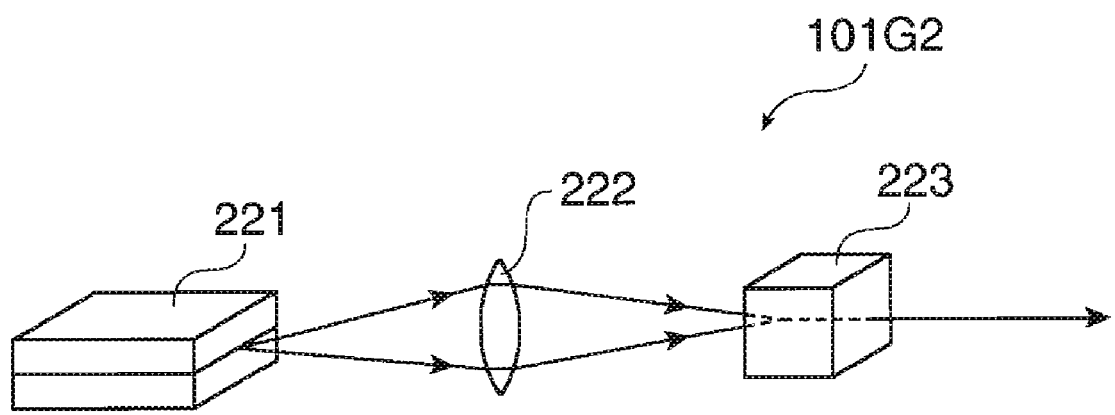
FIG. 2 is a diagram illustrating the configuration of a G2 light source.

FIG. 2 illustrates the configuration of the G2 light source 101G2. A semiconductor laser source 221 disposed in the G2 light source 101G2 emits laser light with a wavelength spectrum having a peak at 980 nm. The laser light from the semiconductor laser source 221 is collimated through a lens system 222 and is then incident on an SHG element 223. The semiconductor laser source 221 has a modulator for modulating the laser light. The SHG element 223 converts the laser light from the semiconductor laser source 221 to laser light of a half wavelength, and lets it out. The laser light with a wavelength spectrum having a peak at 980 nm is thus converted to laser light with a wavelength spectrum having a peak at 490 nm. The SHG element 223 may be made of, e.g., nonlinear optical crystal.

The G2 light source 101G2 can use the semiconductor laser source 221 that emits laser light having a peak wavelength in the range from 940 to 1,000 nm to emit laser light having a peak wavelength in the range from 470 to 500 nm. The Y light source 101Y and the G2 light source 101G2 can use an easily available general-purpose semiconductor laser source because of using the SHG element. The semiconductor laser source and the solid-state laser source are required to be able to modulate laser light in response to image signals.

The Y light source 101Y and the G1 light source 101G1 also have the same configuration as that of the G2 light source 101G2. For example, the Y light source 101Y can use the semiconductor laser source 221 that emits laser light having a peak wavelength in the range from 1100 to 1180 nm to emit laser light having a peak wavelength in the range from 550 to 590 nm. The Y light source 101Y, the G1 light source 101G1, and the G2 light source 101G2 may use a diode-pumped solid-state (DPSS) laser oscillator. The DPSS laser oscillator emits laser light by exciting solid-state crystal with laser light from a laser source. The light sources are configured so as to provide preferable white balance when emitting laser light with respective maximum gray levels. The light sources that emit lights of different wavelength spectra are modulated independently.

Figure 3:
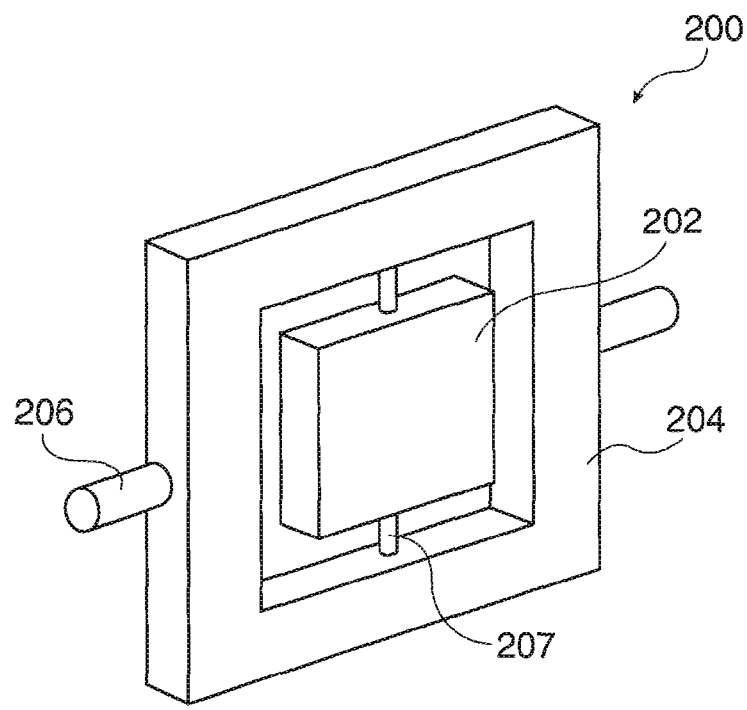
FIG. 3 is a diagram showing a schematic configuration of a scanner.

FIG. 3 shows a schematic configuration of a scanner 200. The scanner 200 has what is called a double gimbal structure having a reflecting mirror 202 and an outer frame 204 around the reflecting mirror 202. The outer frame 204 is joined to a fixing portion (not shown) with a torsion spring 206, or a rotation shaft. The outer frame 204 turns around the torsion spring 206 by the torsion and the returning force to the initial position of the torsion spring 206. The reflecting mirror 202 is joined to the outer frame 204 with a torsion spring 207, or a rotation shaft that is substantially perpendicular to the torsion spring 206. The reflecting mirror 202 reflects the laser light from the light sources. The reflecting mirror 202 is coated with a high-reflection member, such as a metallic thin film made of aluminum or silver.

As the outer frame 204 turns around the torsion spring 206, the reflecting mirror 202 is displaced so as to deflect the laser light in the Y direction over the screen 110 (refer to FIG. 1). The reflecting mirror 202 is also turned around the torsion spring 207 by the torsion and the returning force of the torsion spring 207. The reflecting mirror 202 is also displaced so as to deflect the laser light reflected by the reflecting mirror 202 in the X direction by turning around the torsion spring 207. The scanner 200 thus deflects the laser light from the light sources in the X direction, or a first direction, and in the Y direction, or a second direction that is substantially perpendicular to the first direction, over the screen 110 to be irradiated.

Figure 4:
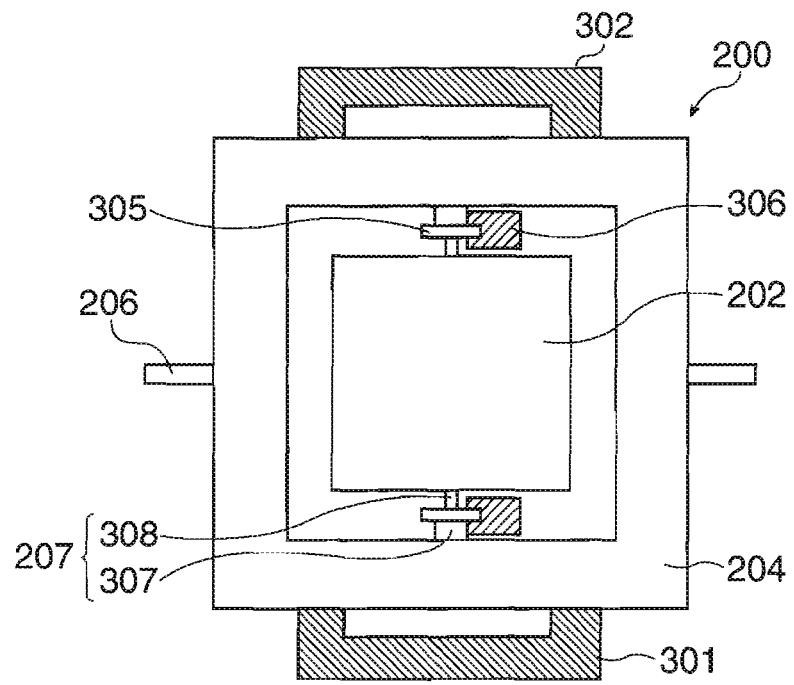
FIG. 4 is an explanatory diagram of a configuration for driving the scanner.

FIG. 4 is an explanatory diagram of a configuration for driving the scanner 200. Assuming that the surface of the reflecting mirror 202 which reflects laser light is a front surface, first electrodes 301 and 302 are disposed at substantially symmetrical positions about the torsion spring 206 in the space on the back of the outer frame 204. When voltage is applied to the first electrodes 301 and 302, a force responsive to the potential difference, e.g., electrostatic force, is generated between the first electrodes 301 and 302 and the outer frame 204. The outer frame 204 is turned around the torsion spring 206 when voltage is alternately applied to the first electrodes 301 and 302.

Specifically speaking, the torsion spring 207 is composed of a first torsion spring 307 and a second torsion spring 308. Between the first torsion spring 307 and the second torsion spring 308 is disposed a mirror-side electrode 305. A second electrode 306 is disposed in the space on the back of the mirror-side electrode 305. When voltage is applied to the second electrodes 306, a force responsive to the potential difference, e.g., electrostatic force, is generated between the second electrode 306 and the mirror-side electrode 305. When voltage in the same phase is applied to both of the second electrodes 306, the reflecting mirror 202 is turned around the torsion spring 207. The scanner 200 thus deflects the laser light in two dimensions by turning the reflecting mirror 202. The scanner 200 can be produced by, e.g., a micro electro mechanical systems (MEMS) technique.

The scanner 200 displaces the reflecting mirror 202 so as to reciprocate laser light a plurality of times in the horizontal X direction while scanning the laser light in the vertical Y direction one time during the period of one frame of an image. The scanner 200 is driven so that the frequency at which laser light is scanned in the X direction, or the first direction, is higher than that at which laser light is scanned in the Y direction, or the second direction. For high-speed scanning of laser light in the X direction, it is preferable for the scanner 200 to resonate the reflecting mirror 202 around the torsion spring 207. The resonance of the reflecting mirror 202 can increase the displacement of the reflecting mirror 202. The increase in the displacement of the reflecting mirror 202 allows the scanner 200 to deflect laser light efficiently with low energy. The reflecting mirror 202 may be driven without resonation.

The scanner 200 may not necessarily be driven by electrostatic force due to the potential difference. For example, the scanner 200 may be driven either by electromagnetic force or using the contraction and expansion properties of a piezoelectric element. With the electromagnetic force, the scanner 200 can be driven by the electromagnetic force generated between the reflecting mirror 202 and a permanent magnet with current. The scanner 200 may include a reflecting mirror for scanning laser light in the X direction and a reflecting mirror for scanning laser light in the Y direction. Alternately, a plurality of scanners may be provided for scanning respective color lights.

Referring back to FIG. 1, the laser light exiting from the scanner 200 passes through the projection system 103, and is then incident on a reflector 105. The reflector 105 is disposed on the inner surface of a housing 107 and in the position opposed to the screen 110. The reflector 105 reflects the laser light from the light scanning device 120 toward the screen 110. The housing 107 tightly seals the space in the housing 107. The screen 110 is disposed on a specified surface of the housing 107. The screen 110 is a transmissive screen that allows the laser light from the light scanning device 120 which is modulated in response to an image signal to pass through. The light from the reflector 105 is incident on the surface inside the housing 107 of the screen 110 and then exits from the surface on the viewer side. The viewer views images with the light exiting from the screen 110.

Figure 5:
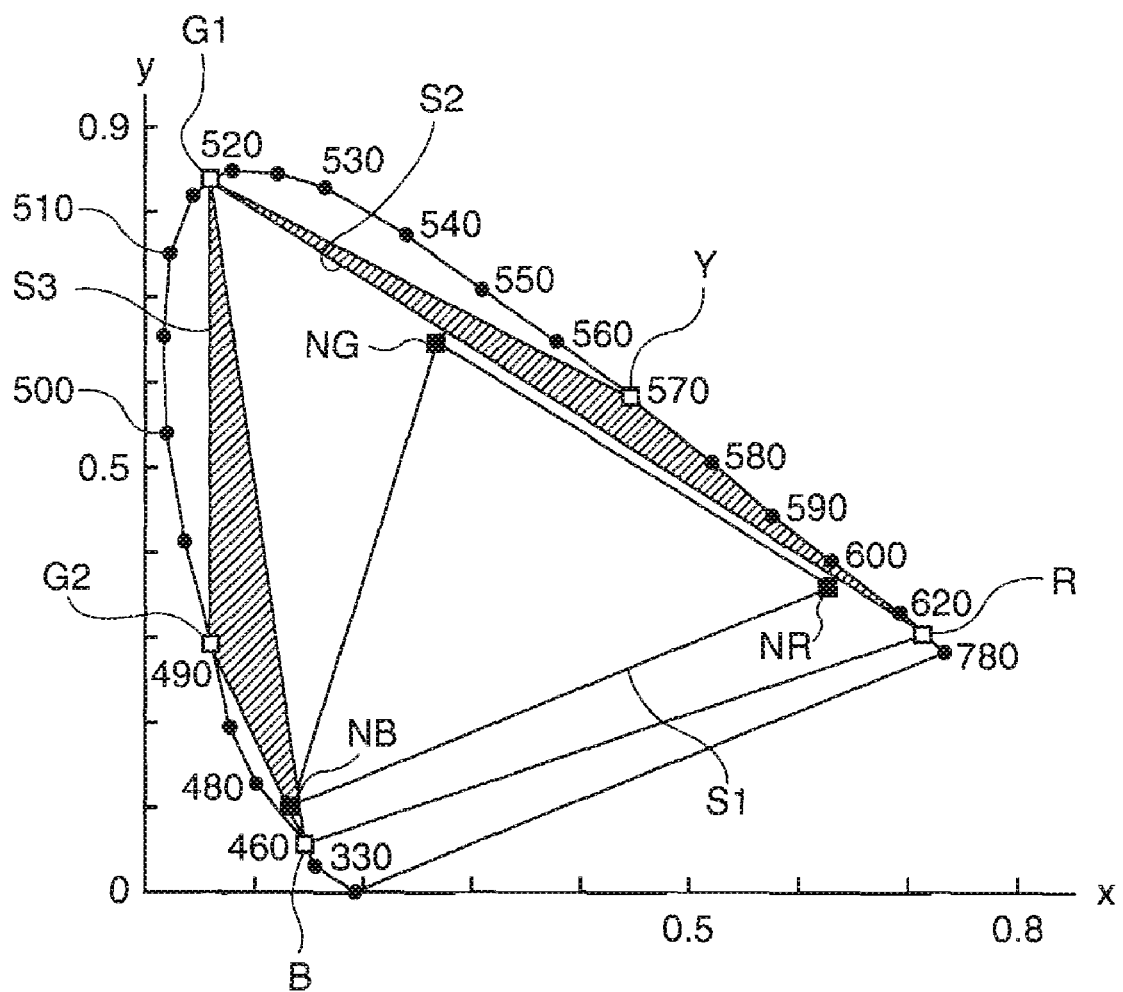
FIG. 5 is a diagram showing the wavelength characteristics of color lights.

FIG. 5 shows an X-Y chromaticity diagram of wavelength characteristics of the color lights from the light scanning device 120. All the colors are displayed in three-dimensional space by plotting the intensity ratio among RGB (color stimulus specifications) on coordinates (RGB colorimetric system). The color stimulus specifications of the color lights are expressed by the ratio of brightness, where the brightness necessary for mixed colors to be viewed in white at a color temperature of 4800 K 1. The coordinate axes are converted appropriately so as to express all the chromaticities as positive values in the three-dimensional space of the RGB colorimetric system to form an XYZ display system. The XYZ display system, or the three-dimensional space, is projected on the X-Y plane to form an X-Y chromaticity diagram. The X-Y chromaticity diagram shows only hue and chroma of color factors except information on brightness.

Points NR, NG, and NB are the respective chromaticity coordinates of R light, G light, and B light used in the general trichromatic image display system. The range S1 surrounded by the triangle with the vertices NR, NG, and NB indicates the range of color obtained by additive color mixture in the trichromatic image display system. Point R indicates the chromaticity coordinates of R light supplied from the R light source 101R. Point G1 indicates chromaticity coordinates of G light supplied from the G1 light source 101G1. Point B indicates chromaticity coordinates of B light supplied from the B light source 101B.

Since the color lights supplied from the laser sources have high monochromaticity, the points R, G, and B are spotted on the outer side of the chromaticity diagram relative to the points NR, NG, and NB. The range S2 of color obtained using the R light source 101R, the G1 light source 101G1, and the B light source 101B is therefore wider than the range S1. A light scanning device using the three light sources, the R light source 101R, the G1 light source 101G1, and the B light source 101B, can express a wider range of color than that by the general trichromatic image display system.

Point Y indicates the chromaticity coordinates of yellow light supplied from the Y light source 101Y. Point G2 indicates the chromaticity coordinates of emerald green light supplied from the G2 light source 101G2. The light scanning device 120 of this embodiment can express the color of a range S3 surrounded by the pentagon with the vertices R, Y, G1, G2, and B by additive color mixture of five color lights. The range S3 is an addition of the range S2 and two hatched portions, a portion surrounded by the points Y, R, and G1 and a portion surrounded by the points G2, G1, and B. Accordingly, the light scanning device 120 can sufficiently express yellow and emerald green having peaks apart from the peak wavelengths of R, G, and B with the Y light source 101Y and the G2 light source 101G2, respectively.

Figure 6:
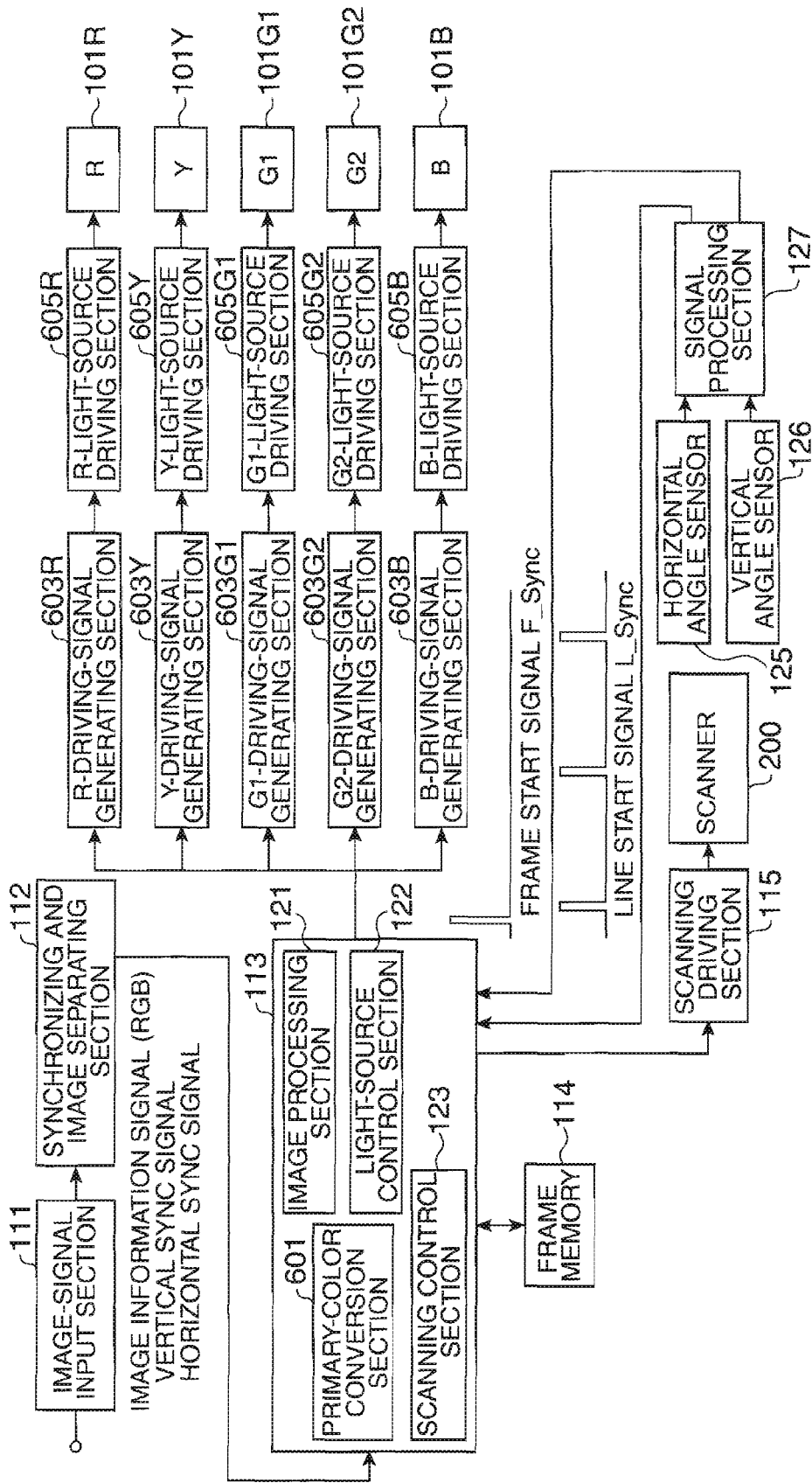
FIG. 6 is a block diagram of a configuration for controlling color-light scanning.

FIG. 6 describes a configuration for controlling color-light scanning. An image-signal input section 111 corrects the characteristics of an image signal input from an input terminal, amplifies the image signal, and the like. The image signal may be either in analog form or digital form. A synchronizing and image separating section 112 separates the signal from the image-signal input section 111 into an image information signals a vertical sync signal, a horizontal sync signal, and outputs them to a control section 113. Of the control section 113, a scan control section 123 generates a driving signal for driving the scanner 200 in response to the vertical sync signal and the horizontal sync signal. A scan driving section 115 drives the scanner 200 in response to the driving signal from the control section 113.

A horizontal angle sensor 125 senses the turning angle of the reflecting mirror 202 (refer to FIG. 3) that moves or scans the laser light in the X direction over the screen 110. A vertical angle sensor 126 senses the turning angle of the reflecting mirror 202 that moves or scans the laser light in the Y direction over the screen 110. A signal processing section 127 generates a frame start signal F_Sync from the displacement of the vertical angle sensor 126, and a line start signal L_Sync from the displacement of the horizontal angle sensor 125, respectively, and outputs them to the control section 113.

When RGB image information signals are input from the light sources to the control section 113, a primary-color conversion section 601 converts the RGB image information signals to image display signals on the color lights. The conversion of the image display signals by the primary-color conversion section 601 can be made by matrix conversion or gray-level correction. The technique for the conversion of display signals for displaying images with multiple primary colors is disclosed in, for example, JP-A-2000-338950 and JP-A-2004-86245.

The image processing section 121 divides the image information input to the control section 113 every scanning line, and outputs them to the frame memory 114. The frame memory 114 stores the image signals from the image processing section 121 frame by frame. The light-source control section 122 outputs the line-by-line image information signals read from the frame memory 114. The control section 113 also generates a pixel timing clock on the basis of the linear velocities calculated from the frame start signal F_Sync and the line start signal L_Sync, the vertical sync signal, and the horizontal sync signal. The pixel timing clock is a signal indicative of the timing at which laser light passes through each pixel, for letting the laser light modulated in response to an image signal in a correct position.

An R-driving-signal generating section 603R generates a driving signal synchronized with a pixel timing clock on the basis of an R-light image information signal generated by the primary-color conversion section 601. An R-light-source driving section 605R drives the R light source 101R in response to the driving signal from the R-driving-signal generating section 603R. A Y-driving-signal generating section 603Y generates a driving signal synchronized with a pixel timing clock on the basis of a Y-light image information signal generated by the primary-color conversion section 601. A Y-light-source driving section 605Y drives the Y light source 101Y in response to the driving signal from the Y-driving-signal generating section 603Y. A G1-driving-signal generating section 603G1 generates a driving signal synchronized with a pixel timing clock on the basis of a G-light image information signal generated by the primary-color conversion section 601. A G1-light-source driving section 605G1 drives the G1 light source 101G1 in response to the driving signal from the G1-driving-signal generating section 603G1.

A G2-driving-signal generating section 603G2 generates a driving signal synchronized with a pixel timing clock on the basis of an emerald-green-light image information signal generated by the primary-color conversion section 601. A G2-light-source driving section 605G2 drives the GA light source 101G2 in response to the driving signal from the G2-driving-signal generating section 603G2. A B-driving-signal generating section 603B generates a driving signal synchronized with a pixel timing clock on the basis of a B-light image information signal generated by the primary-color conversion section 601. A B-light-source driving section 605B drives the B light source 101B in response to the driving signal from the B-driving-signal generating section 603B. For analog control of light sources by amplitude modulation, each driving-signal generating section generates a driving signal having a pulse whose amplitude is controlled according to image information. For digital control of light sources by amplitude modulation, each driving-signal generating section generates a driving signal having a pulse whose pulse width is controlled according to image information. With such configuration, the light sources are modulated independently.

The use of the light scanning device 120 according to this embodiment allows the expression of a wider range of colors than with known light scanning devices that scan RCB lights. Since the light sources that supply lights with different wavelength spectra are modulated independently, images with high color reproducibility can be displayed with lights of different wavelength spectra. This offers the advantage of displaying high-reproducibility images with laser light. The use of the light sources that supply lights with other wavelength spectra in addition to the known color light sources allows the power of laser light necessary for displaying images to be dispersed more. This can reduce loads on the light sources.

Although the configuration for controlling color-light scanning has been described in its preferred form in which RGB image information signals are converted to image information signals for five color lights, it is to be understood that the light scanning device 120 of this embodiment is not limited to the configuration in which RGB image signals are input; for example, image signals having image information on other color lights other than RGB may be input. This configuration allows the expression of a wider range of colors than that when RGB image signals are input.

Although the embodiment includes the Y light source 101Y and the G2 light source 101G2 in addition to the R light source 101R the G1 light source 101G1, and the B light source 101B, the invention may include at least one of the Y light source 101Y and the G2 light source 101G2. The addition of either one of yellow and emerald green to RGB allows the expression of a wider range of colors than that when RGB image signals are input.

For example, with four light sources, the R light source 101R, the G1 light source 101G1, the B light source 101B, and the G2 light source 101G2, it is preferable to set the balance of the amount of laser lights at the maximum gray level to R:G1:B::G2=59%:23%:14%:4%. This provides preferable white balance. Similarly, with four light sources, the K light source 101R, the G1 light source 101G1, the B light source 101B, and the Y light source 101Y, it is preferable to set the balance of the amount of laser lights at the maximum gray level to R:G1:B::Y=56%:21%:16%:4%.

Not only the configuration including RGB, but also a configuration including at least four laser lights with different wavelength spectra can express a wide range of colors. Five or more color lights may also be used. This embodiment uses, as color lights to be added to RGB, yellow having a peak substantially in the middle of peak wavelengths of R and G and emerald green having a peak substantially in the middle of peak wavelengths of G and B. The color lights to be added to RGB may be color light having a peak close to the peak wavelength of one of RGB. For example, the use of color light having a peak close to the peak wavelength of G increases the reproducibility of the color light close to G and allows the dispersion of the power of G light.

The light sources are not necessarily provided to the color lights on a one by one basis. One light source may be provided for at least one of color lights with different wavelength spectra, or alternatively, two or more light sources may be provided to one color light. Particularly, the Y light source 101Y, the G1 light source 101G1, and the G2 light source 101G2 that use an SHG laser source may emit a maximum amount of light lower than that of the R light source 101R and the B light source 101B that are semiconductor light sources. Even with difference in the maximum light amount, preferable white balance can be provided efficiently by determining the number of light sources depending on the output balance.

Figure 7:
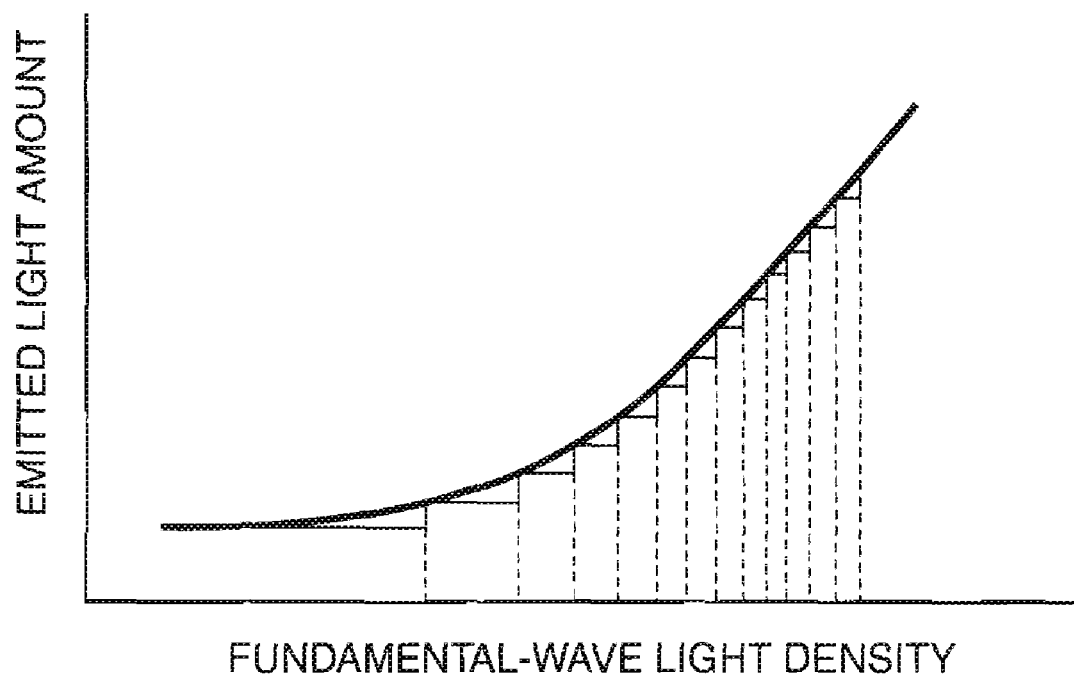
FIG. 7 is a graph plotting the relationship between the light density of the fundamental wave and the amount of light emitted by an SHG element.

The light sources using an SHG laser source can modulate the fundamental wave to be incident on an SHG element serving as a wavelength conversion element by providing a modulator to semiconductor laser sources. The modulation of the fundamental wave allows expression of gray levels in a manner similar to that with a light source that converts no wavelength. As shown in FIG. 7, the SHG element exhibits exponential changes in light amount as the fundamental wave changes in light density. Expressing gray levels using amplitude modulation requires to generate a driving signal in view of changes in wavelength conversion efficiency by the SHG element. Since the wavelength conversion efficiency of the SHG element does not change where the fundamental wave is constant in light density, there is no need to give consideration to the changes in wavelength conversion efficiency when expressing gray levels using pulse-width modulation.

The wavelength conversion element is not limited to the SHG element. The wavelength conversion element may be another element other than the SHG element, such as a third harmonic generation (THG) element and an optical parametric oscillation (OPO) element. The THG element can be made of first nonlinear optical crystal or second nonlinear optical crystal that generate a sum frequency. The first nonlinear optical crystal generates a second harmonic wave like the SHG element. The second nonlinear optical crystal emits a third harmonic wave that is the sum frequency of a second harmonic wave and a fundamental wave whose wavelength has not been converted by the first nonlinear optical crystal. The third harmonic wave has one-third wavelength of the fundamental wave. The THG element converts the laser light from the semiconductor laser source to laser light of one-third wavelength and launches it. The use of the THG element provides a third harmonic wave of 413 nm, that is violet light, using the fundamental wave of 1240 nm, that is infrared light.

While the SHG element and the THG element converts the fundamental wave to a short wavelength wave, the OPO element converts the fundamental wave to a long wavelength wave. The OPO element can be made of nonlinear optical crystal that divides one high frequency wave into two low frequency waves and launches them. The OPO element uses a light resonator that uses two mirrors together. The fundamental wave to be incident on the OPO element can be, e.g., a high frequency wave from the THG element. For example, ultraviolet light of 355 nm is generated from infrared light of 1060 nm by the THG element, and then it is converted to long wavelength light with the OPO element, so that a visible light of 488 nm and an infrared light of 1,300 nm can be generated. Appropriate combination of the semiconductor laser source and the wavelength conversion elements allows the provision of laser light with a desired wavelength.

Second Embodiment

Figure 8:
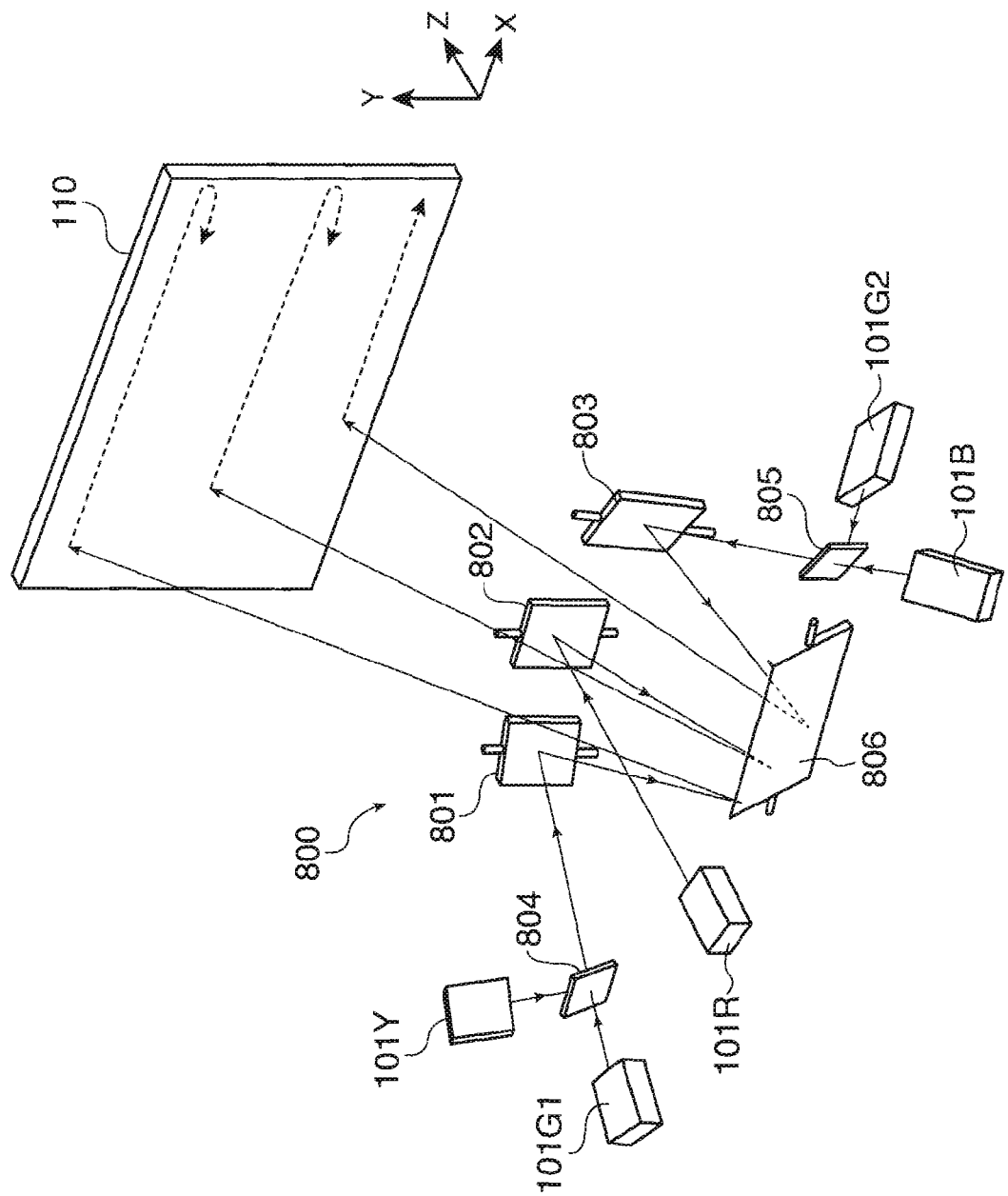
FIG. 8 is a diagram showing a schematic configuration of a light scanning device according to a second embodiment of the invention.

FIG. 8 shows a schematic configuration of essential parts of a light scanning device 800 according to a second embodiment of the invention. The light scanning device 800 deflects color lights with a scanner including first reflecting mirrors 801, 802, and 803 that deflects laser light in the X direction and a second reflecting mirror 806 that deflects laser light in the Y direction. The light scanning device 800 has a first dichroic mirror 804 in the position on which the green light from the G1 light source 101G1 and the yellow light from the Y light source 101Y are incident. The first dichroic mirror 804 allows the green light from the G1 light source 101G1 to pass through, and reflects the yellow light from the Y light source 101Y to thereby combine them and allow them to be incident on the G1- and Y-lights first reflecting mirror 801.

The red light from the R light source 101R is incident on the R-light first reflecting mirror 802. A second dichroic mirror 805 is disposed in the position on which the blue light from the B light source 101B and the emerald green light from the G2 light source 101G2 are incident. The second dichroic mirror 805 allows the blue light from the B light source 101B to pass through, and reflects the emerald green light from the G2 light source 101G2 to thereby combine them and allow them to be incident on the B- and G2-lights first reflecting mirror 803.

The R-light first reflecting mirror 802 reflects the red light from the R light source 101R into the second reflecting mirror 806. The G1- and Y-lights first reflecting mirror 801 reflects the green light from the G1 light source 101G1 and the yellow light from the Y light source 101Y into the second reflecting mirror 806. The B- and G2-lights first reflecting mirror 803 reflects the blue light from the B light source 101B and the emerald green light from the G2 light source 101G2 into the second reflecting mirror 806. The second reflecting mirror 806 reflects all the color lights from the first reflecting mirrors 801, 802, and 803 onto the screen 110. The first reflecting mirrors 801, 802, and 803 and the second reflecting mirror 806 can be formed by coating a dielectric multilayer thereon. The first reflecting mirrors 801, 802, and 803 and the second reflecting mirror 806 may be coated with either a dielectric multilayer or a metallic film.

Assume that the peak wavelengths from the laser lights from the R light source 101R, the G1 light source 101G1, the B light source 101B the G2 light source 101G2, and the Y light source 101Y are 650 nm, 520 nm, 440 nm, 490 nm, and 570 nm, respectively. In this case, setting the light balance at the maximum gray level to, for example, R:G1:B:G2=56%: 21%:16%:4% provides preferable white balance.

The R-light first reflecting mirror 802 reflects red laser light incident thereon at higher reflectance than the other color lights. The G1- and Y-lights first reflecting mirror 801 reflects green and yellow laser lights incident thereon at higher reflectance than the other color lights. The B- and G2-lights first reflecting mirror 803 reflects blue and emerald green laser lights incident thereon at higher reflectance than the other color lights.

The reflecting mirrors can easily achieve higher reflectance for light of a narrow wavelength region than that for a wide wavelength region. For example, the R-light reflecting mirror 802 that reflects only one color light can easily provide reflectance as high as approximately 100 percent. In contrast, reflecting mirrors that reflect a plurality of color lights may have lower reflectance than the reflecting mirror that reflects only one color light. In this embodiment, the G1- and Y-lights first reflecting mirror 801 reflects green light and yellow light of the five color lights, which have relatively small difference in wavelength. The B- and G2-lights first reflecting mirror 803 reflects blue light and emerald green light of the five color lights, which have relatively small difference in wavelength difference. Selecting two color lights having relatively small difference in wavelength provides higher reflectance for the G1- and Y-lights first reflecting mirror 801 and the B- and G2-lights first reflecting mirror 803 than selecting lights in a wide wavelength region.

Launching only lights in high-reflectance wavelength regions into the first reflecting mirrors 801, 802, and 803 reduces the absorption of lights to the first reflecting mirrors 801, 802, and 803. Reducing the absorption of light to the reflecting mirrors prevents the accumulation of heat to the reflecting mirrors to prevent the degradation of the reflecting mirrors, thus providing high reliability. Since the G1- and Y-lights first reflecting mirror 801 and the B- and G2-lights first reflecting mirror 803 each reflect two color lights, the number of reflecting mirrors can be decreased in comparison with providing a reflecting mirrors for each color light. The decrease in the number of reflecting mirrors can reduce the number of components of the light scanning device 800, achieving simple configuration.

Figure 9:
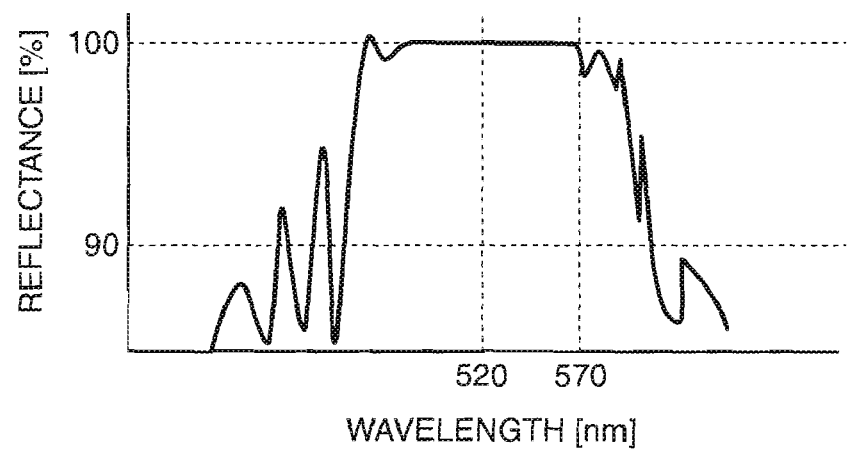
FIG. 9 is a graph plotting the reflection property of a G1- and Y-lights first reflecting mirror.

FIG. 9 plots the reflection property of the G1- and Y-lights first reflecting mirror 301. As described above, to provide preferable white balance, the amount of green light from the G1 light source 101G1 is set to 21 percent, while the amount of yellow light from the Y light source 101Y is set to about four percent. The G1- and Y-lights first reflecting mirror 801 reflects, of green light and yellow light, green light having a large amount of light at the maximum gray level at a higher reflectance than that of the yellow light. The reflection property shown in FIG. 9 indicates that the green light of 520 nm achieves approximately 100 percent reflectance, while the yellow light of 570 nm shows approximately 99 percent reflectance. The B- and G2-lights first reflecting mirror 803 also provides higher reflectance for, of blue light and emerald green light, blue light having a large amount of light at the maximum gray level than for emerald green light.

Thus the light scanning device 800 can achieve high reflectance for one color light having a large amount of light at the maximum gray level than for other color lights although the maximum reflectance cannot be achieved for all color lights reflected by the reflecting mirrors. Color lights having a small amount of light at the maximum gray level have little influence of heat accumulation on the reflecting mirrors. Accordingly, setting higher reflectance for one color light having the maximum amount of light at the maximum gray level than for other color lights can reduce the accumulation of heat.

The combination of the first reflecting mirrors 801, 802, and 803 and color lights is not limited to the above-described combination provided that a combination of a plurality of color lights having relatively small difference in wavelength is incident on the first reflecting mirrors 801, 802, and 803. For example, the green light from the G1 light source 101G1 and the emerald green light from the G2 light source 10102 may be reflected by one of the first reflecting mirrors 801, 802, and 803. The number and combination of reflecting mirrors can be determined depending on the wavelengths of the color lights scanned by the light scanning device 800. For example, three or more color lights may be reflected by one first reflecting mirror. In this case, the reflecting mirror can provide higher reflectance for one of three or more color lights, which have the maximum amount of light at the maximum gray level than that for other color lights.

Alternatively, five first reflecting mirrors may be used for five color lights. In this case, achieving approximately one hundred percent reflectance for the reflecting mirrors minimizes the accumulation of heat in the reflecting mirrors. The embodiment has not necessarily the scanner having the first reflecting mirrors and the second reflecting mirror, but may have a scanner that deflects laser light in two directions, as in the first embodiment.

Third Embodiment

Figure 10:
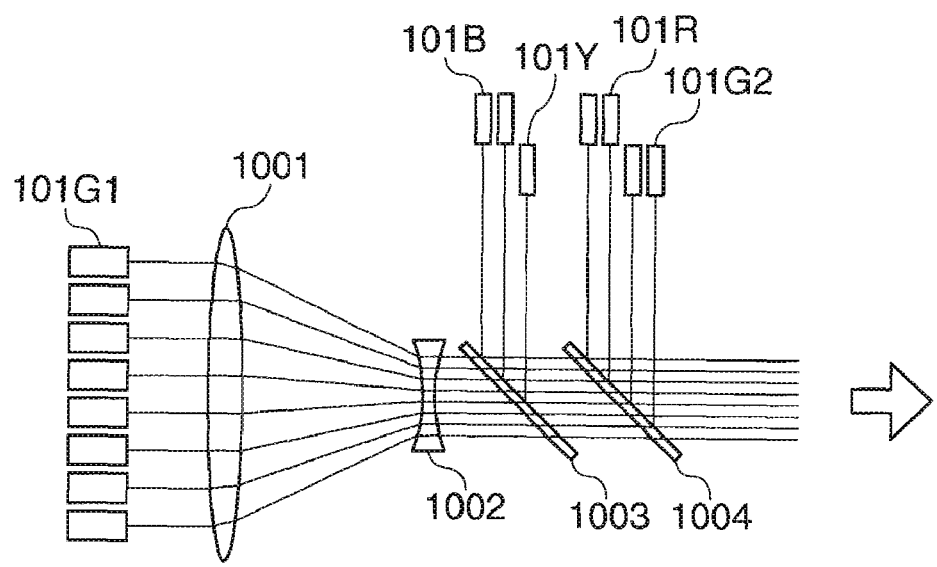
FIG. 10 is a diagram showing a schematic configuration of a light scanning device according to a third embodiment of the invention.

FIG. 10 shows a schematic configuration of essential parts of a light scanning device according to a third embodiment of the invention. The light scanning device of this embodiment includes light G1 light sources 101G1, two B light sources 101B, two R light sources 101R, two G2 light sources 101G2, and one Y light source 101Y. The G1 light sources 101G1 serve as first-color-light sources that supply green light, or first color light. The R light sources 101R serve as second-color-light sources that supply red light, or second color light. The number of the G1 light sources 101G1 serving as the first-color-light sources and the number of the R light sources 101R serving as the second-color-light sources depend on the output balance individually. The numbers of the other light sources 101B, 101G2, and 101Y also depend on the output balance.

The color light sources 101B, 101Y, 101R, 101G2 except the G1 light sources 101G1 are arranged in the direction perpendicular to the direction in, which the G1 light sources 101G1 emit green light. Arranging the G1 light sources 101G1 and the other color light sources 101B, 101Y, 101R, 101G2 except the G1 light sources 101G1 apart from each other provides sufficient space for the largest number of G1 light sources 101G1. A first dichroic mirror 1003 is disposed in the position at which the blue light from the B light sources 101B, the yellow light from the Y light source 101Y, and the green light from the G1 light sources 101G1 cross to one another. The first dichroic mirror 1003 allows green light to pass through, and reflects blue light and yellow light. Between the G1 light sources 101G1 and the first dichroic mirror 1003 are disposed a convex lens 1001 and a concave lens 1002. The convex lens 1001 and the concave lens 1002 converge and collimate light laser beams from the G1 light sources 101G1 in agreement with a scanner (not shown), respectively.

A second dichroic mirror 1004 is disposed in the position at which the red light from the R light sources 101R and the emerald green light from the G2 light source 101G2 and the green light from the G1 light sources 101G1 cross to each other. The second dichroic mirror 1004 allows green light, blue light, and yellow light to pass through, and reflects red light and emerald green light. In place of the convex lens 1001 and the concave lens 1002, another configuration may be used provided that it allows light laser beams from the G1 light sources 101G1 to enter the scanner.

The green lights from the G1 light sources 101G1 are narrowed in space by the convex lens 1001 and the concave lens 1002, and then pass through the two dichroic mirrors 1003 and 1004. The blue light from the B light sources 101B and the yellow light from the Y light source 101Y are reflected by the first dichroic mirror 1003, where the optical paths are bent at 90 degrees, and then pass through the second dichroic mirror 1004. The red light from the R light sources 101R and the emerald green light from the G2 light sources 101G2 are reflected by the second dichroic mirror 1004, where the optical paths are bent at 90 degrees, and then travel toward the scanner (not shown) together with the green light, blue light, and yellow light that have passed through the second dichroic mirror 1004. The color lights are thus combined and incident on the scanner. The scanner scans the combined color lights.

In general, red laser sources are inexpensive and provide high output, while green laser sources are expensive and provide low output. With the same number of the G1 light sources 101G1 and the R light sources 101R, the output of the R light sources 101R needs to be decreased to the same level as that of the G1 light sources 101G1 in order to provide preferable white balance, resulting in waste. With color lights other than the green light and the red light, providing the same number of light sources even with a difference in output may result in waste. The waste of light sources will result in an increase in size and complication of optical systems, increasing the price and preventing miniaturization.

With this embodiment, the number of at least two of the color-light sources with different maximum outputs can be determined individually depending on the output balance. Accordingly, there is no need to decrease the output of the light source with high maximum output to the same level as that of the other light sources with low maximum output, thus preventing the light source with high maximum output from being wasted. This provides a light scanning device capable of scanning a plurality of color lights efficiently depending on the output balance of the color lights. There is also no need to provide light sources with high maximum output more than necessary, providing a simple and inexpensive light scanning device. With a different number of light sources disposed for each color light, providing a scanner for each laser light complicates the configuration of the light scanning device and makes it difficult to drive. The configuration of this embodiment in which color lights are combined and let in the scanner can prevent the complication of the configuration and reduce the load on the driving even with a different number of light sources disposed from color light to color light.

It is to be understood that the configuration for combining color lights and the number and arrangement of color light sources are not limited to those of the embodiment, but may be set appropriately, depending on the wavelengths and the difference in output of color lights supplied from the color light sources. At least two of color light sources may be different in number not only when color lights combined to one are let in the scanner, but also when a plurality of reflecting mirrors are disposed as in the light scanning device 800 of FIG. 8.

The advantages of the image display device will be described which uses the light scanning device in adding color lights other than the red light, green light and blue light. For example, with what is called a three-panel projector that uses three spatial light modulators, the modulated light from the three spatial light modulators are generally combined with a cross-dichroic prism. Four or more color lights can be combined through addition of the cross-dichroic prism. Combining a plurality of color lights with a plurality of cross-dichroic prisms will generate difference in optical distance from the spatial light modulator to a projection lens, depending on the position at which the color lights are incident on the cross-dichroic prisms. A correction lens is required to adjust the optical distance from the spatial light modulator to the projection lens. With the three-panel projector, the optical system may be complicated by the addition of the cross-dichroic prism and the correction lens as color lights increase in number.

What is called a single panel projector that uses one spatial light modulator adopts a method in which, for example, one frame is divided, and each color light is modulated in sequence. In this case, the period for each color in one frame is decreased and it becomes difficult to increase the number of gray levels as color lights increase in number. Furthermore, there is the problem that the frame frequency must be increased with an increasing number of color lights.

The image display device in which color lights are scanned by the light scanning device has the advantage that color lights can be scanned at the same time in one frame without dividing the frame for each color light. The image display device also has the advantage that the number of color lights can easily be increased simply by adding a light source and a scanner without complicating the configuration if the color lights can be scanned in response to image signals, and that the optical system can be simplified.

Figure 11:
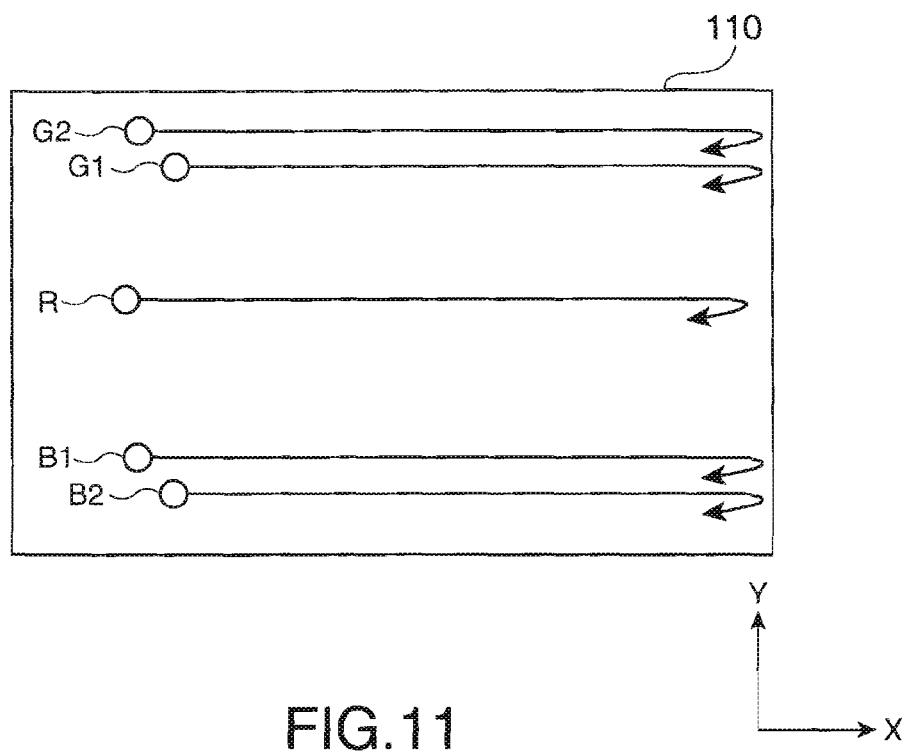
FIG. 11 is a diagram illustrating the scanning position of color lights over the screen.

In scanning color lights with a light scanning device, it is preferable to scan approximate color lights at narrower intervals on the scanning surface than other color lights. The approximate color lights indicate those with close peak wavelengths of the color lights from the color light sources. For example, as shown in FIG. 11, assume that color light (2) approximate to green light and color light (B2) approximate to blue light are scanned in addition to the red (R) light, green (G1) light, and blue (B1) light. The color lights G1 and G2 that are approximate to each other are scanned at narrower space over the screen 110 than that for the other color lights R, B1, and B2. The color lights B1 and B2 that are approximate to each other are scanned at narrower space over the screen 110 than that for the other color lights R, G1, and G2. In this way, scanning the color lights that are approximate to each other closely and the other color lights apart from one another can reduce flickering.

Figure 12:
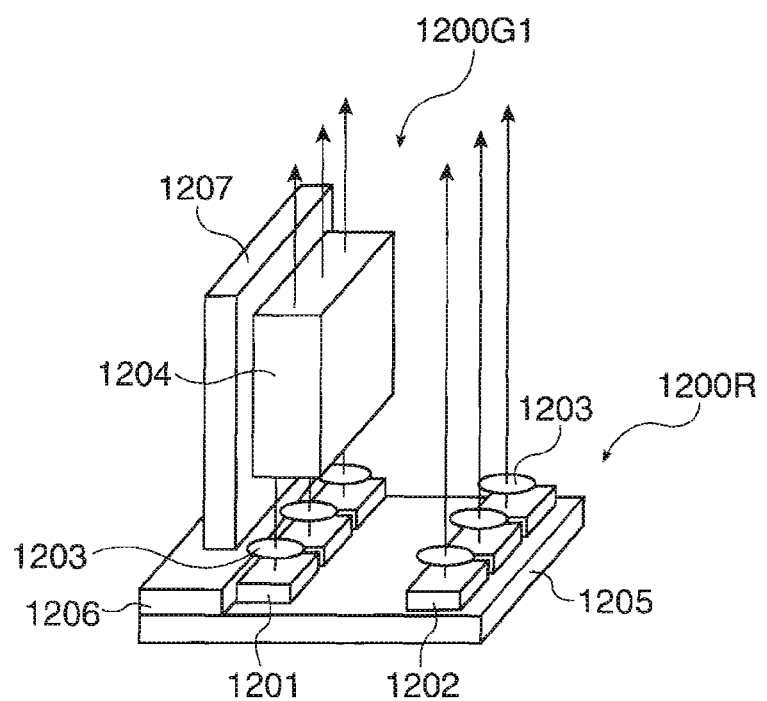
FIG. 12 is an explanatory diagram of a preferable configuration of the vicinity of color light sources.

FIG. 12 illustrates a preferable configuration of the vicinity of the color light sources. An R light source 1200R and a G1 light source 1200G1 shown in FIG. 12 are disposed in one package. The G1 light source 1200G1 is a first-color light source that supplies green light, or a first color light. The R light source 1200R is a second-color light source that supplies red light, or a second color light.

The G1 light source 1200G1 launches the lights from three G1-light-source semiconductor lasers 1201 through collimator lenses 1203 into an SHG element 1204. The SHG element 1204 is a first-color-light wavelength conversion element that converts the wavelength of the light from the G1-light-source semiconductor lasers 1201, or a first laser source. The G1 light source 1200G1 supplies the light whose wavelength is converted by the SHG element 1204. The R light source 1200R includes three R-light-source semiconductor lasers 1202 serving as a second laser source that supplies red light, or second color light. The R light source 1200R supplies the light from the three R-light-source semiconductor lasers 1202 through the collimator lenses 1203.

The three G1-light-source semiconductor lasers 1201 and the three R-light-source semiconductor lasers 1202 are both disposed on a radiator 1205. The radiator 1205 radiates the heat generated by the driving of the G1-light-source semiconductor lasers 1201 and the R-light-source semiconductor lasers 1202 to the outside of the package. A temperature controller 1207 disposed in contact with the SHG element 1204 controls the temperature of the SHG element 1204.

The SHG element 1204 serving as a wavelength conversion element has the property of changing wavelength conversion efficiency with temperature. The temperature controller 1207 controls the temperature of the SHG element 1204 in a predetermined range of the reference value, e.g., ±1 degree. A heat insulator 1206 is disposed between the temperature controller 1207 and the radiator 1205. The heat insulator 1206 thermally insulates the G1-light-source semiconductor lasers 1201, or the first laser source, and the R-light-source semiconductor lasers 1202, or the second laser source, from the SHG element 1204 serving as the first-color-light wavelength conversion element through the temperature controller 1207 and the radiator 1205. The heat insulator 1206 may be made of glass or ceramic.

Thermally insulating the SHG element 1204 from the semiconductor lasers 1201 and 1202 that are heating elements with the heat insulator 1206 reduces changes in wavelength conversion efficiency due to the heat from the semiconductor lasers 1201 and 1202. Even when the R light source 1200R and the G1 light source 1200G1 are accommodated in one package, changes in wavelength conversion efficiency can be reduced by interposing the neat insulator 1206 between the semiconductor lasers 1201 and 1202 and the SHG element 1204. This reduces changes in wavelength conversion efficiency and the size of the light source.

Not only the R light source 1200R and the G1 light source 1200G1, but also the other color light sources may be integrated. Providing a heat insulator reduces changes in wavelength conversion efficiency not only when a light source having a wavelength conversion element and a light source having no wavelength conversion element are integrated but also when light sources having a wavelength conversion element are integrated. Furthermore, not only the light sources of two color lights are integrated but also light sources of three or more color lights may be integrated.

Fourth Embodiment

Figure 13:
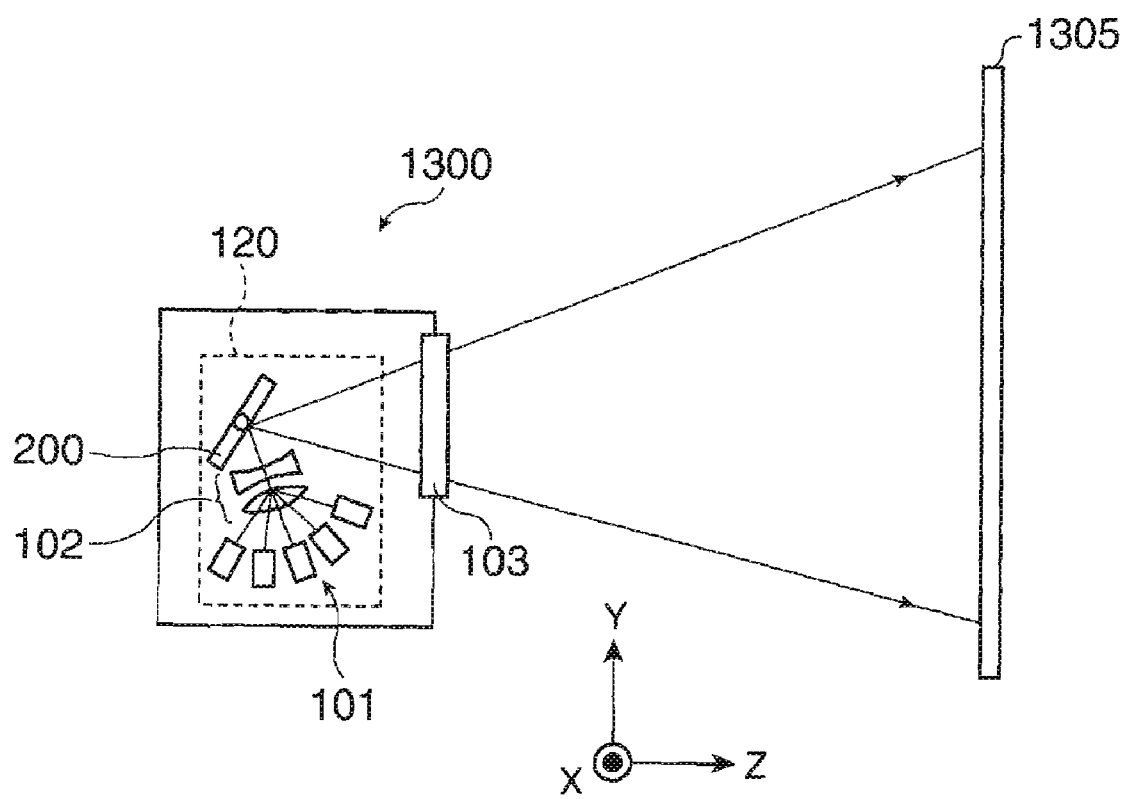
FIG. 13 is a diagram showing a schematic configuration of an image display device according to a fourth embodiment of the invention.

FIG. 13 shows a schematic configuration of an image display device 1300 according to a fourth embodiment of the invention. The image display device 1300 is what is called a front scanner that scans laser light onto a screen 1305 disposed on the viewer side, for image viewing with the light reflected from the screen 1305. The image display device 1300 includes the light scanning device 120, as in the first embodiment. The same components as those of the first embodiment are given the same reference numerals and a description thereof will be omitted. The laser light from the light scanning device 120 passes through the projection system 103 and is then incident on the screen 1305. This embodiment can also display high-reproducibility images with light beams.

While the light scanning devices of the above-described embodiments include a laser source, another light source is possible provided that it can emit light beams. For example, the light source may use a solid-state light emitting element such as a light-emitting diode (LED). The light scanning device of the invention may be used not only in an image display device but also in electronic equipment that emits laser light such as laser printers.

The light scanning devices according to the embodiments of the invention are suitable for use in an image display device that scans light in response to an image signal.

The entire disclosure of Japanese Patent Application Nos: 2005-123194, filed Apr. 21, 2005 and 2006-021976, filed Jan. 31, 2006 are expressly incorporated by reference herein.

What is claimed is:

1. A light scanning device comprising:
   at least four light sources that provide light beams having different wavelength spectra; and
   a scanner that scans the light beams from the light sources in a first direction and a second direction substantially perpendicular to the first direction,
   wherein the scanner scans at least two color lights that are approximate to each other at a narrower space over a scanning surface than that of other color lights other than the approximate color lights.

2. The light scanning device according to claim 1, further comprising:
   a red light source that emits red light, a green light source that emits green light, and a blue light source that emits blue light; and
   at least one of a light source that emits light with a wavelength spectrum having a peak in the range from 550 nm to 590 nm and a light source that emits light with a wavelength spectrum having a peak in the range from 470 nm to 500 nm.

3. The light scanning device according to claim 2, wherein the light source that emits light with a wavelength spectrum having a peak in the range from 550 nm to 590 nm and the light source that emits light with a wavelength spectrum having a peak in the range from 470 nm to 500 nm each have a wavelength conversion element.

4. The light scanning device according to claim 1, wherein the light sources that emit lights with different wavelength spectra are modulated independently.

5. The light scanning device according to claim 1, wherein the light sources are disposed one or more for at least one of the lights with the different wavelength spectra.

6. The light scanning device according to claim 1, wherein the scanner includes reflecting mirrors that reflect the light beams,
   wherein one of the reflecting mirrors reflects color light incident on the reflecting mirror at higher reflectance than that of other color lights different from the color light incident on the reflecting mirror.

7. The light scanning device according to claim 6, wherein the at least one of the reflecting mirrors reflects at least two color lights.

8. The light scanning device according to claim 7, wherein the reflecting mirror reflects one of the at least two color lights, whose amount is the maximum at the maximum gray level, at higher reflectance than that of other color lights other than the one color light of the at least two color lights.

9. The light scanning device according to claim 1, further comprising:
   a first color light source that emits first color light and a second color light source that emits second color light,
   wherein the first color light source and the second color light source are different in number.

10. The light scanning device according to claim 1, wherein
    the light source has a wavelength conversion element and expresses gray levels by modulating the fundamental wave to be incident on the wavelength conversion element.

11. The light scanning device according to claim 1, wherein the light source includes:
    a laser source that emits laser light and a wavelength conversion element that converts the wavelength of the light from the laser source; and
    a heat insulator that insulates the laser source and the wavelength conversion element from each other.

12. The light scanning device according to claim 11, further comprising:
    a first color light source that emits first color light and a second color light source that emits second color light, wherein
    the first color light source includes a first laser source that emits the first color light;
    the first color light source emits the first color light using a first-color-light wavelength conversion element that converts the wavelength of the light from the first laser source;
    the second color light source includes a second laser source that emits the second color light; and
    the heat insulator insulates the first laser source and the second laser source from the first-color-light wavelength conversion element.

13. An image display device for displaying images with the light from a light scanning device, wherein
    the light scanning device is the light scanning device according to claim 1.

* * * * *